United States Patent
Redaelli et al.

(10) Patent No.: US 10,793,263 B2
(45) Date of Patent: Oct. 6, 2020

(54) ROTOR FOR A HOVER-CAPABLE AIRCRAFT AND METHOD FOR DETECTING THE ATTITUDE OF A BLADE WITH RESPECT TO A HUB OF SUCH A ROTOR

(71) Applicant: LEONARDO S.P.A., Rome (IT)

(72) Inventors: Matteo Redaelli, Samarate (IT); Luca Riviello, Samarate (IT); Attilio Colombo, Samarate (IT); Lorenzo Trainelli, Milan (IT); Emanuele Zappa, Mandello L. (IT); Alberto Rolando, Milan (IT); Potito Cordisco, Calolziocorte (IT); Edoardo Vigoni, Lecco (IT); Mauro Terraneo, Calolziocorte (IT); Riccardo Grassetti, Cassina de'Pecchi (IT)

(73) Assignee: LEONARDO S.P.A., Rome (IT)

( * ) Notice: Subject to any disclaimer, the term of this patent is extended or adjusted under 35 U.S.C. 154(b) by 57 days.

(21) Appl. No.: 16/089,179

(22) PCT Filed: Apr. 7, 2017

(86) PCT No.: PCT/IB2017/052025
§ 371 (c)(1),
(2) Date: Sep. 27, 2018

(87) PCT Pub. No.: WO2017/175195
PCT Pub. Date: Oct. 12, 2017

(65) Prior Publication Data
US 2019/0112038 A1    Apr. 18, 2019

(30) Foreign Application Priority Data

Apr. 8, 2016 (EP) .................................... 16164552

(51) Int. Cl.
*G01B 11/02* (2006.01)
*G01B 11/26* (2006.01)
(Continued)

(52) U.S. Cl.
CPC ............ *B64C 27/008* (2013.01); *B64C 27/48* (2013.01); *B64C 27/54* (2013.01); *B64C 27/78* (2013.01);
(Continued)

(58) Field of Classification Search
CPC ......... B64C 27/00; B64C 27/48; B64C 27/54; B64C 27/57; G01B 11/02; G01B 11/26;
(Continued)

(56) References Cited

U.S. PATENT DOCUMENTS 4,379,678 A * 4/1983 Carlock .................. B64C 27/54
416/158
4,465,367 A 8/1984 Sabatier
(Continued)

FOREIGN PATENT DOCUMENTS

DE  103 48 981   6/2005
EP  0 112 031    6/1984
(Continued)

*Primary Examiner* — Brandi N Hopkins
(74) *Attorney, Agent, or Firm* — Leason Ellis LLP

(57) ABSTRACT

A rotor for a hover-capable aircraft is described that comprises: a drive mast; a hub operatively connected to the drive mast and rotatable about a first axis; and at least two blades hinged to the hub, via a rigid or elastically deformable connection, so as to be able to assume an attitude rotated about and/or translated along at least a second axis with respect to said hub; the aircraft further comprising sensor means configured to detect the attitude of at least one said blade with respect to the hub; the sensor means are configured to acquire an optical image associated with the attitude of the blade with respect to the hub.

17 Claims, 9 Drawing Sheets

(51) Int. Cl.
    *H04N 5/225*     (2006.01)
    *B64C 27/00*     (2006.01)
    *B64C 27/48*     (2006.01)
    *B64C 27/78*     (2006.01)
    *B64F 5/60*     (2017.01)
    *B64C 27/54*     (2006.01)

(52) U.S. Cl.
    CPC .............. *B64F 5/60* (2017.01); *G01B 11/026* (2013.01); *G01B 11/26* (2013.01)

(58) Field of Classification Search
    CPC .......... G01B 7/30; H04N 5/225; B64D 45/00; G01M 5/00
    See application file for complete search history.

(56) References Cited

U.S. PATENT DOCUMENTS

| | | | |
|---|---|---|---|
| 4,583,862 A * | 4/1986 | Ferrar | B64C 27/008 356/139.03 |
| 2009/0214342 A1 * | 8/2009 | Brindejonc | B64C 27/605 416/115 |
| 2013/0243597 A1 | 9/2013 | Perrin et al. | |
| 2014/0061369 A1 * | 3/2014 | Schank | B64C 27/008 244/17.13 |
| 2016/0153775 A1 * | 6/2016 | Hocquette | G01B 11/26 356/139.03 |

FOREIGN PATENT DOCUMENTS

| | | |
|---|---|---|
| EP | 2778049 | 9/2014 |
| EP | 2 860 106 | 4/2015 |
| EP | 3025958 | 6/2016 |

\* cited by examiner

ROTOR FOR A HOVER-CAPABLE AIRCRAFT AND METHOD FOR DETECTING THE ATTITUDE OF A BLADE WITH RESPECT TO A HUB OF SUCH A ROTOR

CROSS-REFERENCE TO RELATED PATENT APPLICATIONS

This application is a U.S. National Phase Application under 35 U.S.C. § 371 of International Patent Application No. PCT/IB2017/052025, filed Apr. 7, 2017, which claims the priority of European Application No. 16164552.8, filed Apr. 8, 2016, which is incorporated by reference as if expressly set forth in its entirety herein.

TECHNICAL FIELD

The present invention relates to a rotor for an aircraft capable of hovering, in particular a convertiplane or a helicopter, or a helicopter having a configuration derived from a traditional helicopter.

The present invention also relates to a method for detecting the attitude of a blade with respect to a hub of such a rotor.

BACKGROUND ART

Known helicopters essentially comprise a fuselage, a main rotor positioned on the top of the fuselage and a tail rotor located at the rear end of the fuselage.

In greater detail, the rotor in turn comprises a hub rotatable about a first axis and equipped with a plurality of blades hinged to the aforesaid hub, and a mast connected to a drive member and operatively connected to the hub to drive it in rotation about the first axis.

There are several known types of rotor, each of which provides for a different embodiment of the hinging of the blades to the hub via a rigid or elastically deformable connection.

Depending on the type of rotor, each blade has one or more degrees of rotational freedom with respect to the hub. These degrees of freedom may correspond to rigid rotations or be implemented, according to the type of hub, through elastic deformation of the blade with respect to the hub.

More specifically, the three degrees of rotational freedom of the blade correspond to:
  rotation with respect to the hub and about a second, flapping axis transversal to the rotation axis of the hub; and/or
  rotation with respect to the hub and about a third axis coincident with the extension direction of the blade and therefore substantially radial to the second axis, so as to alter the pitch angle; and/or
  rotation with respect to the hub and about a fourth, drag (or lead-lag) axis parallel to and offset with respect to the rotation axis and substantially orthogonal to the first flapping axis.

In this way, it possible to identify the angular orientation of each section of the blade in space with respect to the hub through three angles commonly known as the flapping, pitch and lead-lag angles. These angles are defined between a direction integral with the section of the blade and the second, third and fourth axes, respectively.

In the fully articulated rotor, all three of the above-mentioned degrees of rotational freedom correspond to respective rigid rotations about the second, third and fourth axes.

Otherwise, in the teetering or seesaw rotor, only the degrees of rotational freedom related to rotations about the second axis and the third axis correspond to rigid rotations.

In this type of rotor, each section of the blade has:
  two degrees of rotational freedom associated with the two angles of rigid rotation about the second and the third axis, respectively; and
  one degree of rotational freedom associated with the elastic rotation of the blade itself.

It is important to underline that each blade is hinged to the hub via one or more mechanical hinges that provide the above-mentioned degrees of rotational freedom or, in the case of hingeless rotors, via elastomeric bearings.

Alternatively, in the case of so-called bearingless rotors, the hub and the blades are made of an elastically deformable material, the flexibility of which enables providing the aforesaid degrees of freedom.

Due to the dynamic forces acting on the blade, for example the action of centrifugal force, the blade or elastomeric bearing that might be present deform elastically. It follows that the transverse sections of each blade can elastically move in space with respect to the hub and parallel to the aforesaid first, second and third axes.

During operation of the rotor, each section of the blade is thus subjected to elastic displacements with respect to the hub and parallel to the above-mentioned first, second and third axes.

Summarizing, each transverse section of each blade has, depending on the type of rotor:
  up to three degrees of rotational freedom provided via rigid or elastically deformed rotation about one or more of the second, third and fourth axes; and
  up to three degrees of translational freedom provided via the respective elastic deformations parallel to one or more of the second, third and fourth axes.

The set of these degrees of freedom defines the spatial attitude of each section of the blade with respect to the hub.

Within the industry there is awareness of the need to determine, in real time, the attitude of certain blade sections of particular interest with respect to the hub, i.e. the value of the rotation angles related to the degrees of rotational freedom and the elastic deformations related to the degrees of translational freedom of the blade with regard to the hub.

US 2014/0061369 describes a magnetic system for determining the position of helicopter blades.

More precisely, the system for determining the position of the blades comprises a plurality of magnets carried by the hub and Hall Effect magnetic sensors carried by the rotor blades.

U.S. Pat. No. 4,583,862 describes a system for determining the attitude of helicopter blades, comprising: a light beam source arranged on an end of each blade and a pair of sensors arranged on the hub. In turn, each sensor comprises an opaque screen provided with a grating and a plurality of detectors placed on the other side of the screen with respect to the light source. The determination system detects the lead-lag and flapping angles of the blades, based on the position of the light beam identified by the detectors.

U.S. Pat. No. 4,465,367 describes a system for measuring the displacement of the free extremities of helicopter blades with respect to the rotational plane of the blades. The measurement system comprises a stroboscopic lamp, a reflective tape placed at the extremity of each blade and a control unit for the stroboscopic lamp. The passage of the reflective tapes through the light beam emitted by the stroboscopic lamp permits visualization of the positions of the blades extremities.

EP-A-2778049 describes a system for measuring the flapping angle of a rotor blade. The system comprises an RVDT type of angular displacement transducer.

US-A-2013/0243597 describes a system for measuring the angular position of the blades of a helicopter with respect to the second flapping axis or to the fourth drag axis. The measurement system comprises a plurality of elastically flexibly rods interposed between the hub and the roots of the blades, and a plurality of strain gauges associated with the corresponding rods. Each strain gauge is configured to detect the orientation of the associated blade with respect to the second flapping axis and the fourth drag axis, upon flexure of the corresponding rod.

Within the industry, there is awareness of the need to determine the displacements and the rotations of the blades of a helicopter rotor with as small a number of components as possible, in order to facilitate adaptation to different types of rotor and require the least invasive modifications to the design of the blades.

DISCLOSURE OF INVENTION

The object of the present invention is to manufacture a rotor for aircraft capable of hovering that enables meeting the aforesaid requirement in a simple and inexpensive manner.

EP-A-3025958 discloses a rotor for hover-capable aircraft according to the preamble of claims 1 and 11.

EP-A-112031 discloses a position detector comprising means defining an elongated field of view, and a target fixed to a rotor blade whose position is to be detected and carrying a reference mark, and a sensor to scan the field of view. The target is capable of being in any range of positions along the filed of view.

The above-mentioned object is achieved by the present invention, in so far as it relates to a rotor for hover-capable aircraft according to claim 1.

The present invention also relates to a method of detecting the attitude of at least one blade with respect to a hub of a rotor for a hover-capable aircraft, according to claim 11.

BRIEF DESCRIPTION OF THE DRAWINGS

For a better understanding of the present invention, a preferred embodiment is described below, purely by way of a non-limitative example and with reference to the accompanying drawings, in which.

BEST MODE FOR CARRYING OUT THE INVENTION

Figure 1:
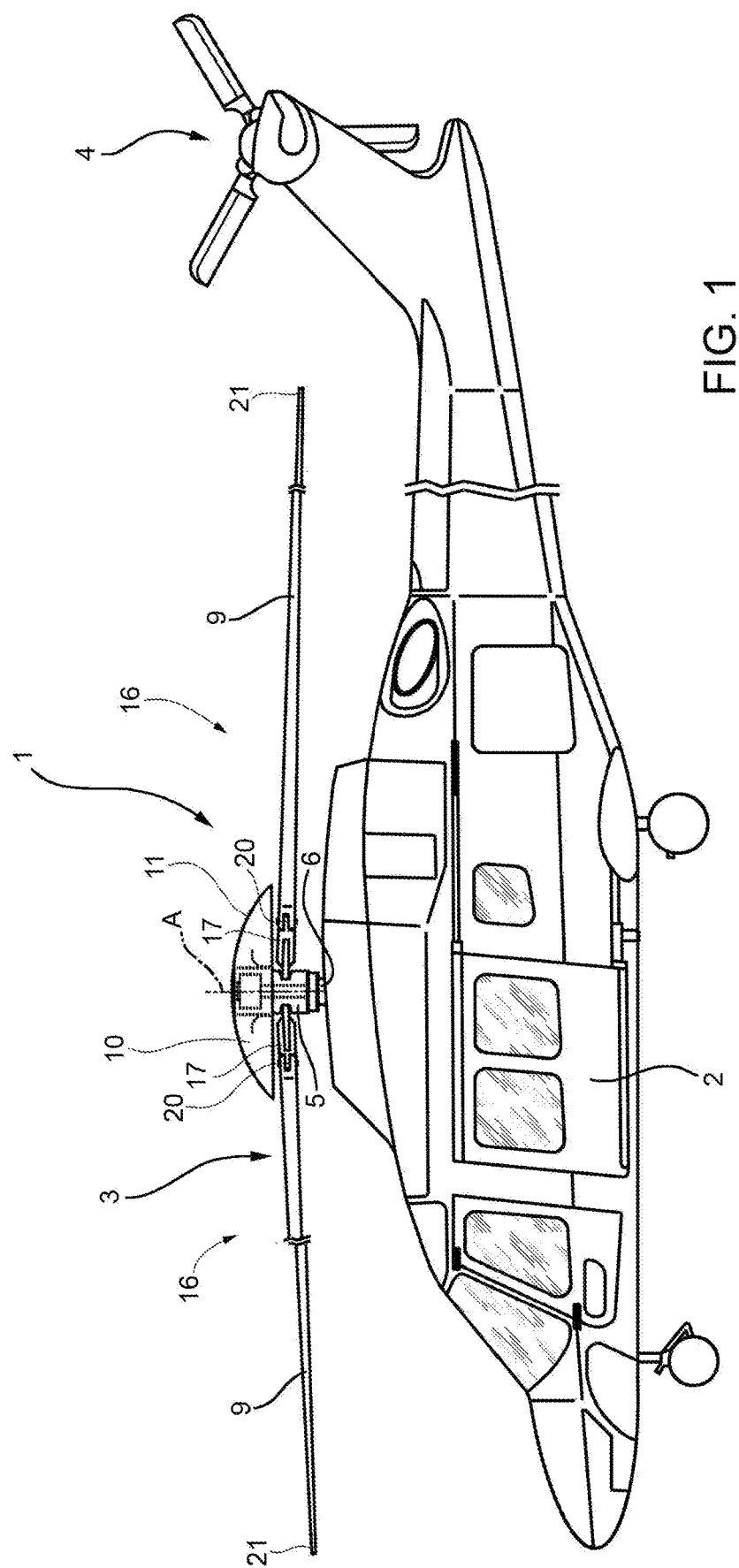
FIG. 1 is a side view of a helicopter with a rotor for an aircraft capable of hovering that is made according to the principles of the present invention.

Referring to FIG. 1, reference numeral 1 indicates an aircraft capable of hovering, in particular a helicopter, basically comprising a fuselage 2, a main rotor 3 positioned on the top of the fuselage 2 and rotatable about an axis A, and a tail rotor 4 located at one end of the fuselage 2 and rotatable about an axis transversal to axis A.

In greater detail, the main rotor 3 comprises a hub 5, centred on axis A and carrying a plurality of cantilever-mounted blades 9, which extend radially to axis A.

The main rotor 3 further comprises a mast 6 rotatable about axis A, angularly integral with the hub 5 and coupled, in a manner not shown, with a drive member, for example a turbine, carried by the helicopter 1. In particular, the mast 6 is hollow.

Figure 2:
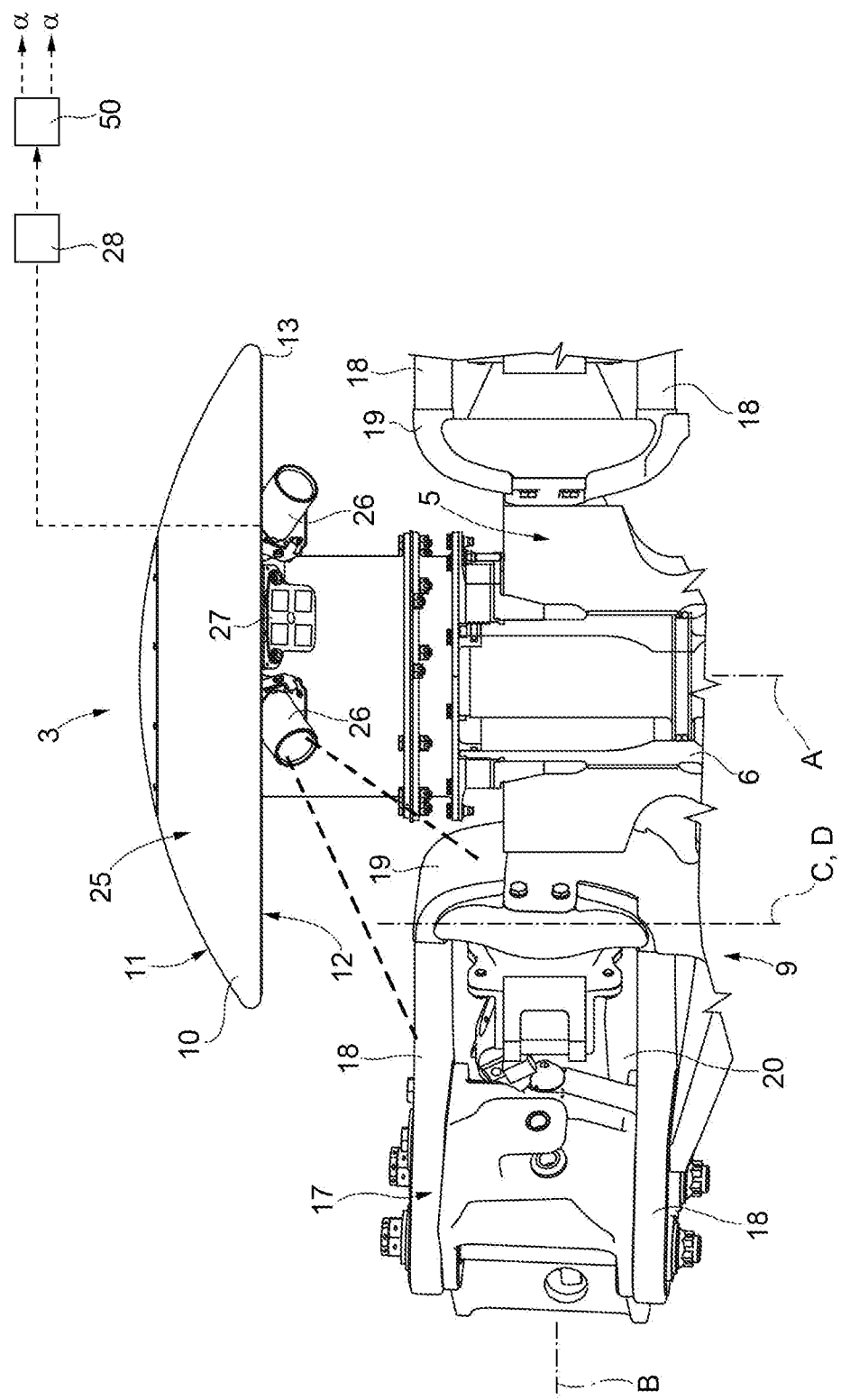
FIG. 2 is a partial sectional side view of the rotor in FIG. 1, with parts removed for clarity.

More precisely (FIG. 2), the mast 6 is partly housed inside the hub 5 and is angularly integral with the hub 5 through connection means of known type.

It is important to point out that there are various known types of rotor, each of which has a different embodiment for the hinging of the blades 9 to the hub 5.

According to the type of rotor, each transverse section of each blade 9 has one or more degrees of rotational freedom with respect to the hub 5.

Figure 9:
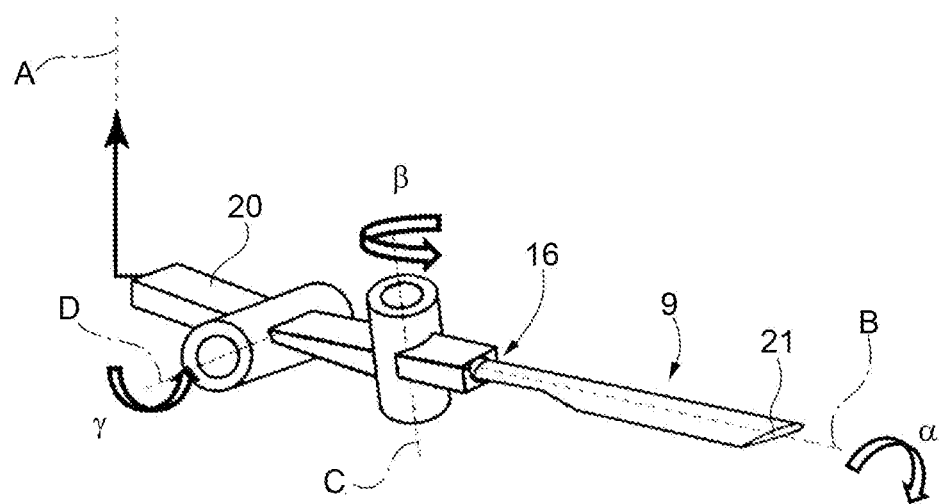
FIG. 9 is a diagram that illustrates the degrees of rotational freedom of each blade of the rotor in FIGS. 2 to 8.

These degrees of rotational freedom are shown by way of non-limitative example in FIG. 9 and correspond to:
- a pitch angle $\alpha$, which is associated with a rotation about axis B, which enables altering the pitch angle of the blade 9;
- a lead-lag angle $\beta$, which is associated with a rotation about an axis C parallel to and offset with respect to axis A, which enables a lead-lag movement of the blade 9; and
- a flapping angle $\gamma$, which is associated with a rotation about an axis D transversal to axes A, B and C, which enables a flapping movement of the blade 9.

Depending on the type of rotor 3 and the hinging of the blades 9 to the hub 5, the above-mentioned angles $\alpha$, $\beta$ and $\gamma$ correspond to rotations that are rigid or obtained through elastic deformation of the blades 9.

In the embodiment shown, the rotor 3 is of the fully articulated type, i.e. the angles $\alpha$, $\beta$ and $\gamma$ correspond to rigid rotations about the respective axes B, C and D.

Figure 3:
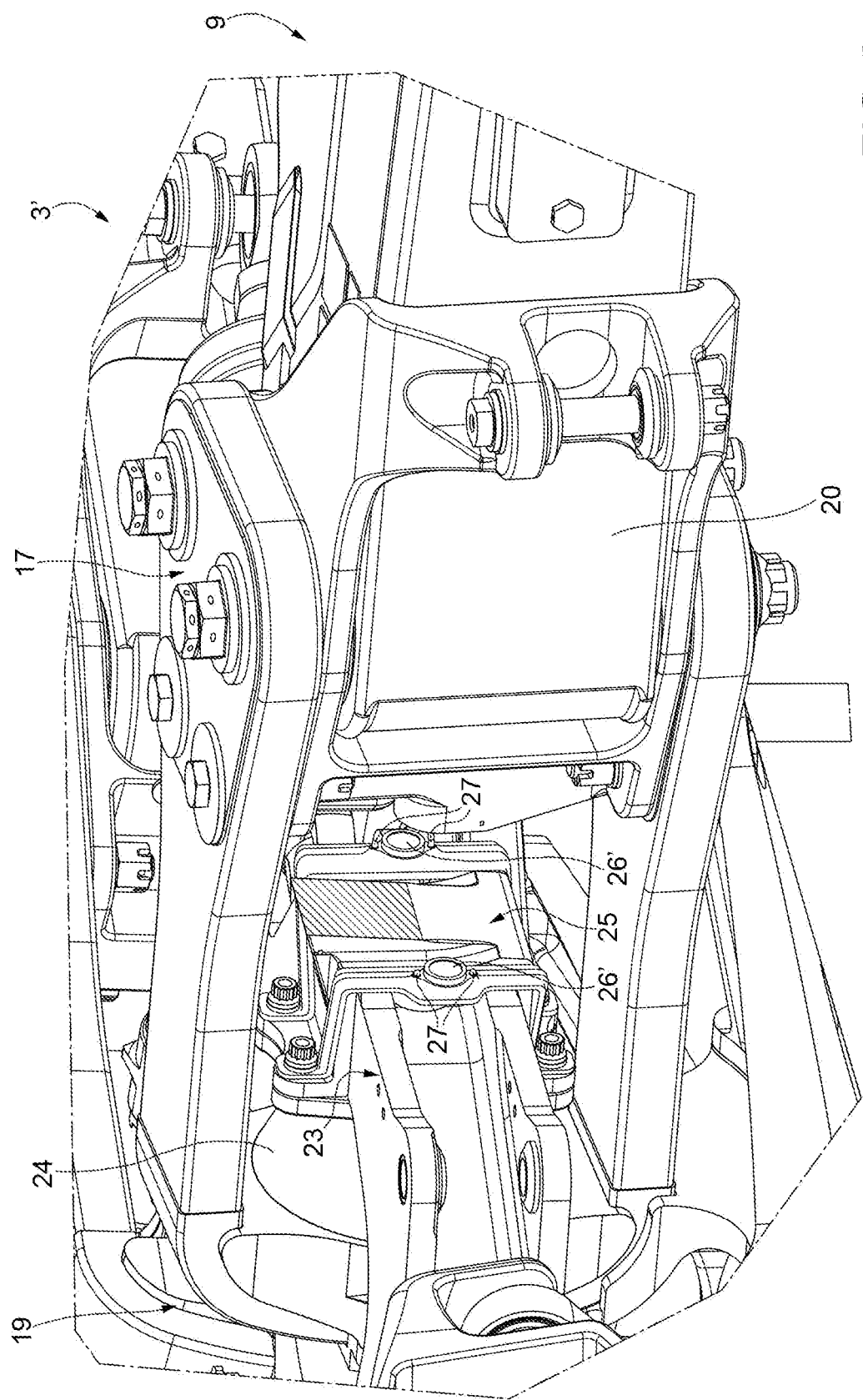
FIG. 3 is a highly enlarged perspective view of the rotor in FIG. 2.

In the embodiment shown, the blades 9 are hinged to the hub 5 via elastomeric bearings 24 (only one of which is shown in FIG. 3).

As a consequence, the sections transversal to axis B of each blade 9 are also subjected to elastic displacements along axes B, C and D, following the forces acting on each blade 9 during operation of the rotor 3, in particular the centrifugal force.

To summarize, it is possible to associate six degrees of freedom with each transverse section of each blade 9, of which three are rotational and correspond to the values of angles $\alpha$, $\beta$, and $\gamma$ and three are translational and correspond to the displacements along axes A, B and C.

In this description, the term attitude of the transverse sections of the blade 9 shall hereinafter mean the value of the aforesaid degrees of freedom of a section of the blade 9.

The rotor 3 also comprises a flow conveyor 10 designed to guide the aerodynamic flow on the rotor 3 and so reduce aerodynamic resistance and reduce the effect of main rotor wash on the tail rotor.

In greater detail, the flow conveyor 10 is annular, extends around axis A and is located on the opposite side of the hub 5 with respect to the fuselage 2.

The flow conveyor 10 has a "hat-like" shape and is delimited by a two surfaces 11 and 12 axially facing each other; more specifically, surface 11 axially delimits the flow conveyor 10 on the opposite side to the hub 5 while surface 12 axially delimits the flow conveyor 10 on the side closest the hub 5.

Surface 11 is continuous and extends, proceeding in a radial direction starting from axis A, at an axially decreasing distance from the hub 5.

Surface 12 has an annular shape that is centred on axis A.

Surfaces 11 and 12 are joined along a circular edge 13, this also centred on axis A.

Surfaces 11 and 12 are shaped in such a way that their axial distance decreases when proceeding in a radial direction starting from axis A.

As visible in the accompanying drawings, each blade 9 extends mainly along an axis B substantially radial with respect to axis A and comprises a main body 16 (only partially visible in the accompanying drawings) designed to define the support/manoeuvring surfaces of the helicopter.

The rotor 3 comprises a plurality of connection elements 17 fastened to the hub 5 and to which the main bodies 16 of the respective blades 9 are hinged.

In turn, the main body 16 comprises two ends 20 and 21, opposite to each other along axis B and respectively located in radially inner and outer positions with respect to axis A.

In particular, the connection element 17 of each blade 9 is substantially C-shaped and is formed by a pair of parallel arms 18, between which the radially innermost end of the main body 16 of the blade 3 is fastened, and a connection portion of the arms 18 designed to engage a respective seat 22 (FIG. 2) defined by a plate 23 of the hub 5 lying on a plane orthogonal to axis A.

More precisely, the connection portion 19 of the connection element 17 of each blade 9 engages a respective seat 22 of the hub 5 and enables articulation of the blade 9 with respect to the hub 5.

The helicopter 1 also comprises a sensor unit 25 configured to detect the attitude of the blades 9 with respect to the hub 5.

The sensor unit 25 is advantageously configured to acquire an optical image of the attitude of each blade 9 with respect to the hub 5.

Figure 4:
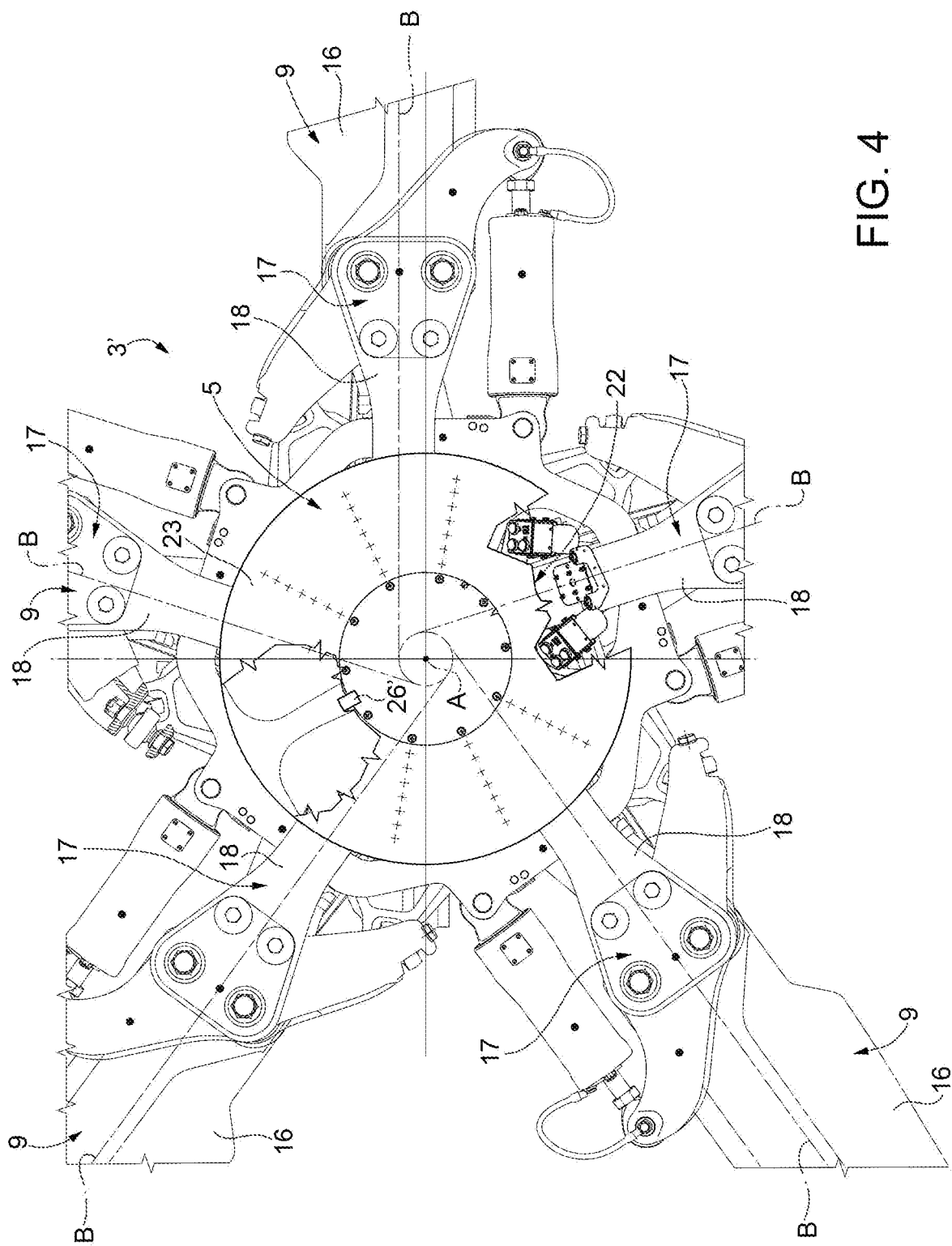
FIG. 4 is a top view of the rotor in FIG. 3, with parts removed for clarity.
Figure 5:
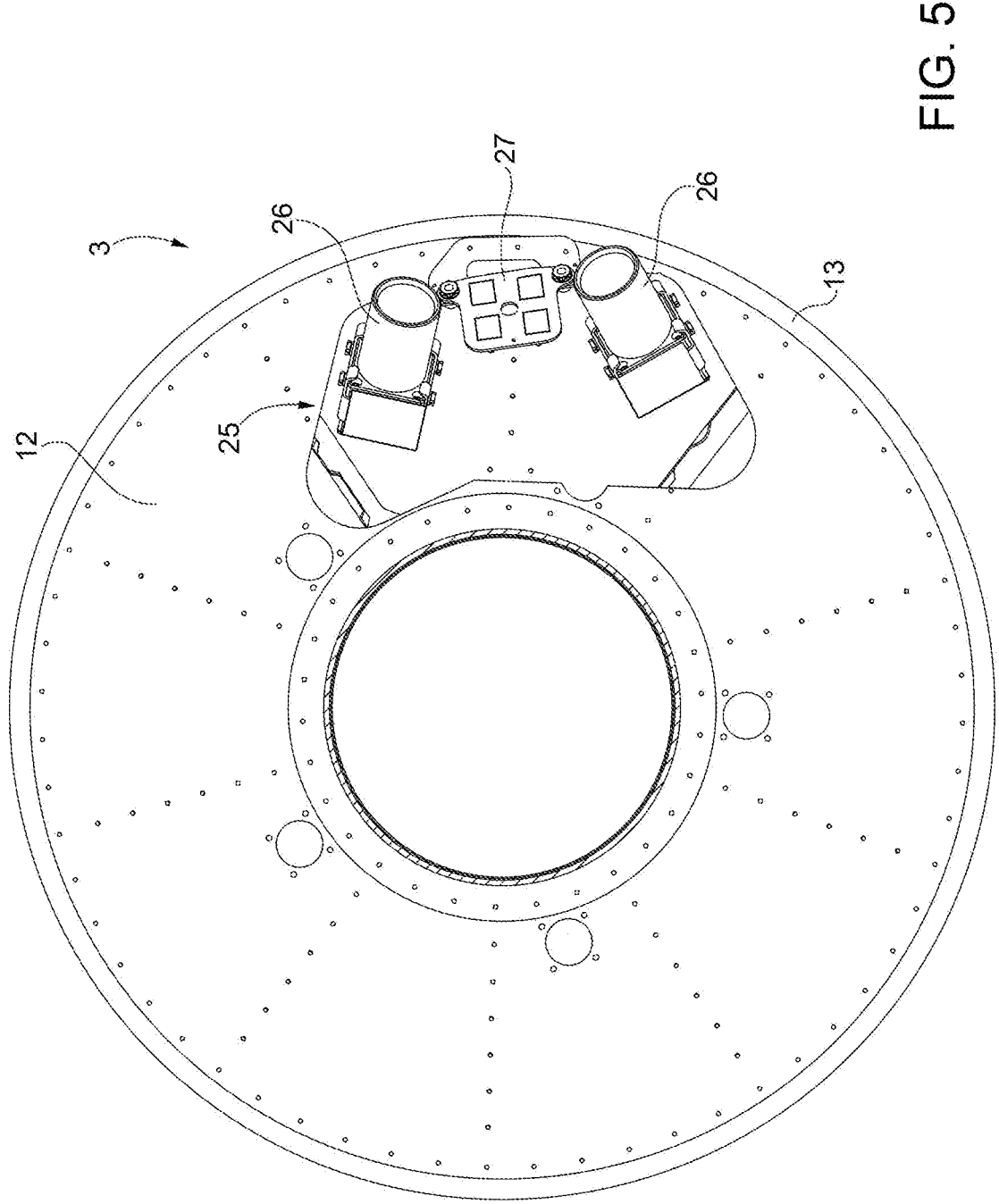
FIG. 5 is a view from below of the rotor in FIGS. 3 and 4, with parts removed for clarity.
Figure 6:
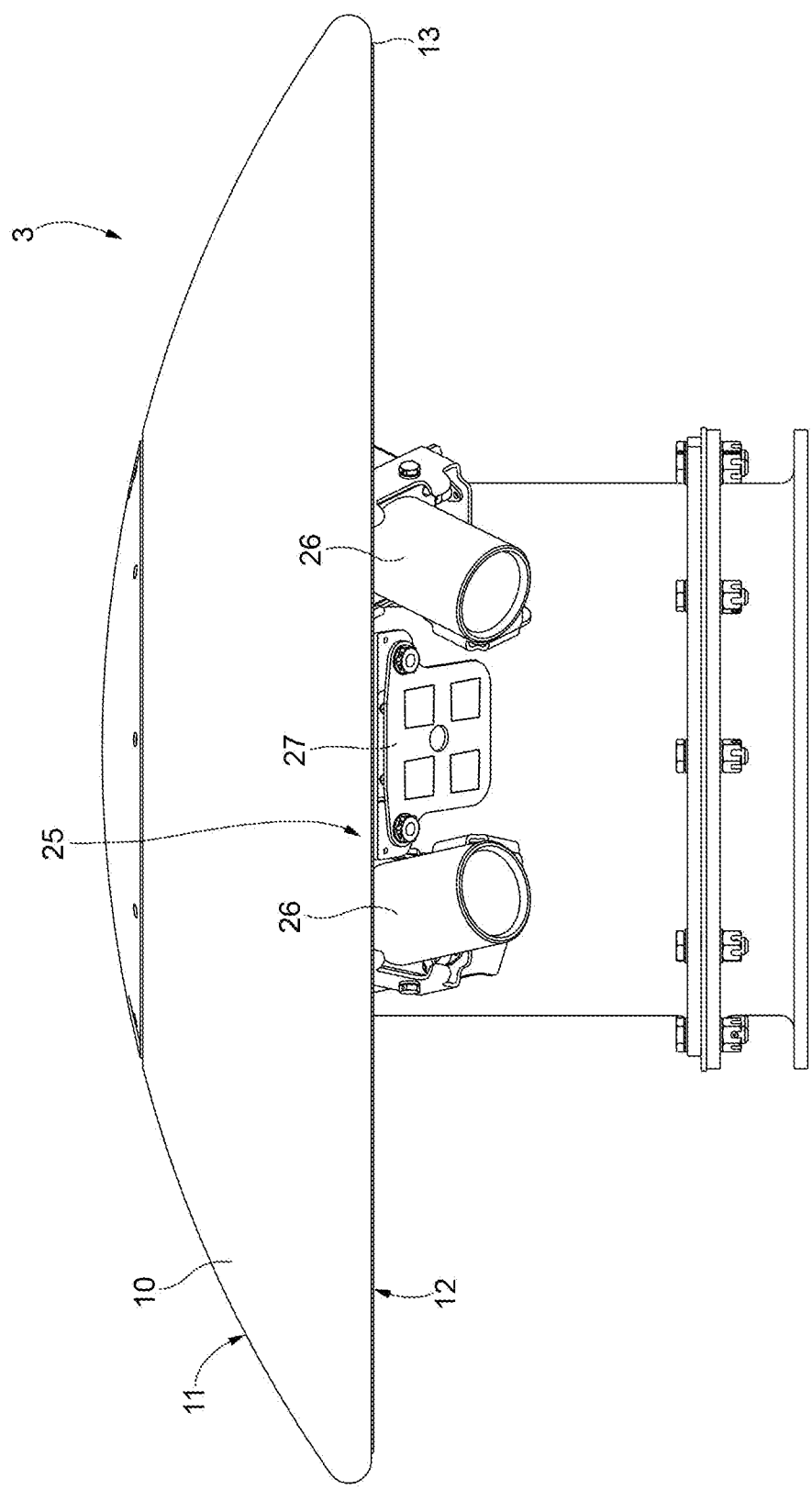
FIGS. 6 and 7 are highly enlarged front views of some components of the rotor in FIGS. 3 to 5.
Figure 7:
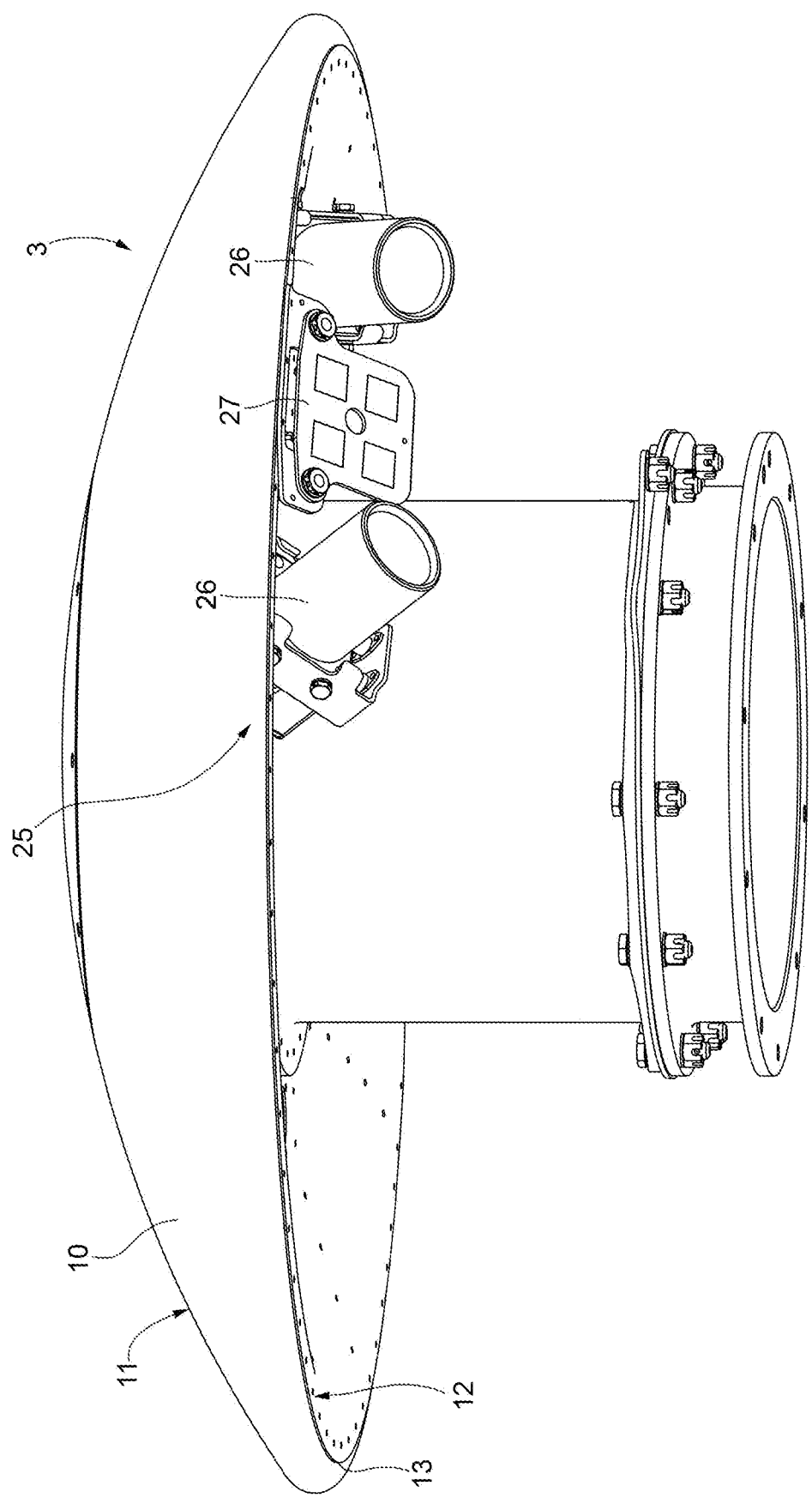
Figure 8:
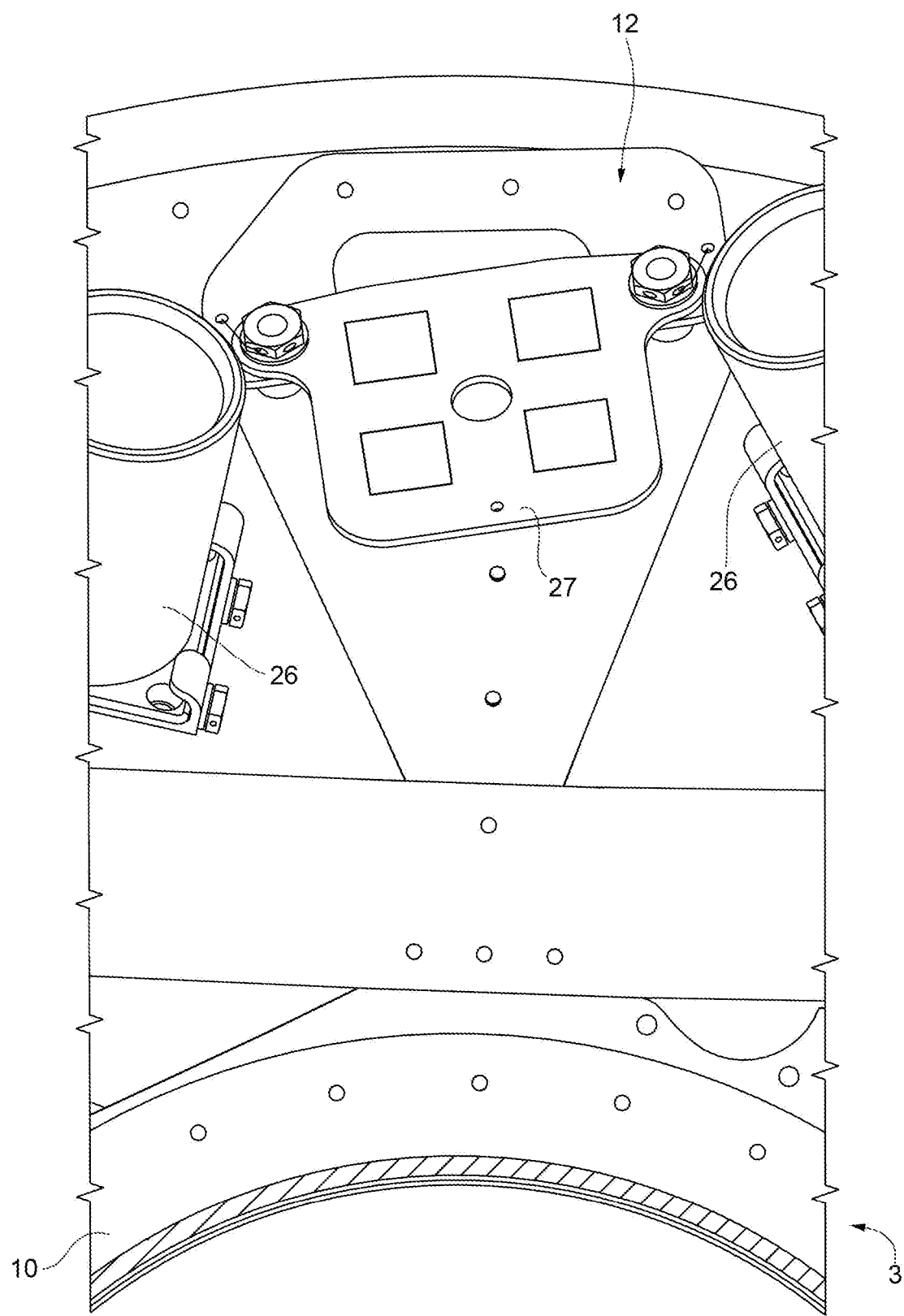
FIG. 8 is a highly enlarged view from below of some details of the rotor in FIGS. 2 to 7.

More specifically, the sensor unit 25 comprises one or more cameras 26 (FIGS. 4, 5 and 6).

The sensor unit 25 also comprises a control unit 28 (only schematically shown in FIG. 2), which is programmed to process the images acquired by the camera 26 and determine the attitude of the blades 9.

In a preferred embodiment of the present invention, the sensor unit 25 comprises a single camera 26 to produce the optical image of each blade 9.

Alternatively, the sensor unit 25 comprises two stereoscopic cameras 26 to produce the optical image of each blade 9.

More precisely, the cameras 26 are mounted on surface 12 of the flow conveyor 10 and face towards the respective blades 9.

Preferably, the cameras 26 are aimed to acquire the image of the attitude of the blades 9 at the connection elements 17 of the respective blades 9.

Alternatively, the cameras 26 are aimed to acquire the optical image of the attitude of the blades 9 at ends 20 of the respective blades 9.

In particular, surface 12 comprises an illuminating device 27 to illuminate the areas of interest of the blades 9 during the optical image acquisition step.

The illuminating device 27 is synchronized with the acquisition of optical images by the cameras 26.

The helicopter 1 also comprises an autopilot 50 (only schematically shown in FIG. 2), which generates the control signals for the blades 9. These control signals adjust, for example, the pitch angles α of the blades 9, according to flight conditions and the mission profile to be performed.

In one particular embodiment, the autopilot 50 receives input from the control unit 28 comprising the values of the angles α, β and γ and the elastic displacements along axes B, C and D of the blades 9 of the rotor 3, and generates the control signals also on the basis of these values.

In use, the drive mast 6 rotates about axis A, rotationally driving the hub 5 and the blades 9.

The operation of the rotor 3 is described below, where just one blade 9 is considered.

The blade 9, while being driven by the hub 5, varies its attitude with respect to the hub 5.

In particular, the blade 9 rotates with respect to the hub 5 and about axes B, C and D by angles α, β and γ.

At the same time, each transverse section of the blade 9 is subjected to an elastic displacement, for example under the action of centrifugal force, having components parallel to axes B, C and D.

The sensor unit 25 determines the attitude of the blade 9 during operation of the rotor 3.

More precisely, the illuminating devices 27 illuminate the areas of interest of the blades 9 and the cameras 26 acquire the image of the blades 9 at the connection element 17 and/or end 20 of the blade 9.

This image is processed by the control unit 28, which determines the attitude of the blade 9.

Referring to FIG. 3, a rotor according to a different embodiment of the present invention is indicated as a whole by reference numeral 3'. Rotor 3' is similar to rotor 3 and shall be described hereinafter only with regard to the differences from the later; where possible, corresponding or equivalent parts of rotors 3 and 3' shall be indicated with the same reference numerals.

In particular, rotor 3' differs from rotor 3 in that the cameras 26' are carried on the plate 23 of the hub 5, are housed in the space defined between the plate 23 and the connection elements 17 of the relevant blades 9, and are configured to acquire respective images of the corresponding connection elements 17.

In the case shown, the cameras 26' are micro-cameras.

The operation of rotor 3' is similar to the operation of rotor 3 and is therefore not described in detail.

From examination of the rotor 3, 3' and the method according to the present invention, the advantages that can be achieved therewith are evident.

In particular, the sensor unit 25 is configured to acquire images associated with the attitudes of the blades 9 with respect to the hub 5, i.e. the value of angles α, β and γ and the rigid or elastic displacements of the sections of the blades 9.

It follows that the sensor unit 25 is able to detect the value of the rotations and/or displacements corresponding to all the degrees of rotational or translational freedom of the blades 9.

This detection of all the degrees of freedom of the blades 9 is performed with a small number of components and so as not to require the application of additional structures or detectors on the blades 9 that could affect the dynamic and fluid-dynamic behaviour.

In addition, the sensor unit 25 works in a contactless manner and is therefore characterized by high reliability.

The sensor unit 25 can be easily applied to different types of rotors 3 and 3', such as, for example fully-articulated, semi-articulated or rigid rotors 3 and 3', whether with physical hinges or hingeless.

Furthermore, the sensor unit 25 is able to detect the value of the elastic displacement of the sections of the blades 9, along the respective extension axes B, with respect to the hub 5. In the case where the blades 9 are hinged to the hub 5 via elastomeric bearings 24 in the hingeless solution, or via elastomeric elements in the bearingless solution, these displacements are indicative of the degree of wear and deterioration of the above-mentioned elastomeric components. It follows that the sensor unit 25 is able to provide a real-time indication of the operational condition of these elastomeric bearings 24.

Finally, the attitude of the blades 9 detected by the sensor unit 25 can be efficaciously used as input data for the autopilot 50 of the helicopter 1. In this way, the autopilot 50 processes signals associated with the rotor 3 or 3', which have a higher pass band than the signals associated with the attitude of the fuselage 2 and commonly used as input data for the autopilot 50. In consequence, the autopilot 50 has better speed and precision characteristics than autopilots of known type normally used in helicopters of known type.

Finally, it is also clear that modifications and variants can be made regarding the previously described rotor 3 or 3' and method without departing from the scope of the present invention.

In particular, the sensor unit 25 could be applied to the tail rotor 4 instead of rotor 3 or 3'.

Instead of being fully-articulated, rotor 3 could be of the rigid, semi-articulated, see-saw, hingeless or bearingless type, or in any case configured in such a way that the above-mentioned degrees of freedom of the blades 9 are achieved via rigid or elastically deformable connections different from those of rotor 3 or 3'.

The rotor 3 or 3' could be applied to a convertiplane or to configurations derived from a helicopter.

The invention claimed is:

1. A rotor (3, 3') for a hover-capable aircraft (1), comprising:
   a drive mast (6);
   a hub (5) operatively connected to said drive mast (6) and rotatable about a first axis (A); and
   at least two blades (9) hinged to said hub (5), via a rigid or elastically deformable connection, so as to be able to assume an attitude rotated about and/or translated along at least a second axis (B, C, D) with respect to said hub (5);
   said rotor (3, 3') further comprising sensor means (25) configured to detect said attitude of at least one said blade (9) with respect to said hub (5);
   said sensor means (25) being configured to acquire an optical image associated with said attitude of at least one section of said blade (9) with respect to said hub (5);
   characterized in that said sensor means (25) comprise a camera (26, 26');
   said sensor means (25) comprising at least one said camera (26, 26') for each said blade (9).

2. A rotor according to claim 1, characterized in that said sensor means (25), in use, are rotationally driven about said first axis (A) directly or indirectly by said hub (5).

3. A rotor according to claim 2, characterized in that it comprises a flow conveyor (10) rotatable about said first axis (A) in an angularly integral manner with said hub (5);
   said flow conveyor (10) carrying said sensor means (25).

4. A rotor according to claim 1, characterized in that said sensor means (25) are configured to acquire the attitude of said blade (9) at a root portion (20) of said blade (9);
   said root portion (20) defining an end of said blade adjacent to said hub (5).

5. A rotor according to claim 1, characterized in that said sensor means (25) are configured to detect the attitude of said blade (9) at a connection element (17) of said blade (9) to said hub (5).

6. A rotor according to claim 5, characterized in that said sensor means (25) are carried by said hub (5) and are configured to acquire an optical image of said connection element (17).

7. A rotor according to claim 1, characterized in that it comprises an illuminating device (27) designed to illuminate, in use, said blade (9), when said optical image is acquired, in use, by said sensor means (25).

8. A rotor according to claim 1, characterized in that said blade (9) is angularly movable with respect to said hub (5), so to be able to rigidly rotate about said second axis (D) parallel to and offset with respect to said first axis (A) or about a third axis (C) transversal to said second axis (D) and first axis (A);
   and/or characterized in that said blade (9) is supported with respect to said hub (5) so as to be able to elastically deform parallel to a fourth extension axis (B) of the blade (9).

9. An aircraft (1) including a rotor (3, 3') according to claim 1, wherein the aircraft comprises one of a helicopter and a convertiplane.

10. An aircraft according to claim 9, characterized in that it comprises an autopilot (50) configured to generate a plurality of control signals to alter the attitude of said blades (9); said autopilot (50) receiving as input, in use, the attitude of said blades (9) detected by said sensor means (25).

11. A method for detecting the attitude of at least one blade (9) with respect to a hub (5) of a rotor (3) for a hover-capable aircraft (1);
   said blade (9) being hinged to said hub (5) via a rigid or elastically deformable connection, so as to be able to assume an attitude rotated about and/or translated along at least a second axis (B, C, D) with respect to said hub (5);
   said method comprising the step of:
   i) detecting the attitude of at least one section of said blade with respect to the hub (5);
   said step i) comprising the further step ii) of acquiring, via sensor means (25), an optical image associated with said attitude of at least said blade (9) with respect to said hub (5);
   characterized in that said sensor means (25) comprise a camera (26, 26'); said sensor means (25) comprising at least one said camera (26, 26') for each said blade (9).

12. A method according to claim 11, characterized in that said step i) comprises the further step iii) of rotationally driving said sensor means (25) integral with said hub (5); and/or characterized in that said step i) comprise the step iv) of illuminating said blade (9) during said step ii).

13. A method according to claim 11, characterized in that it comprises the step v) of supplying said optical image as input data to an autopilot (50) designed to generate control signals for an aircraft (1) comprising said rotor (3).

14. A rotor (3, 3') for a hover-capable aircraft (1), comprising:
   a drive mast (6);
   a hub (5) operatively connected to said drive mast (6) and rotatable about a first axis (A); and at least two blades (9) hinged to said hub (5), via a rigid or elastically deformable connection, so as to be able to assume an attitude rotated about and/or translated along at least a second axis (B, C, D) with respect to said hub (5);

said rotor (3, 3') further comprising sensor means (25) configured to detect said attitude of at least one said blade (9) with respect to said hub (5);

said sensor means (25) being configured to acquire an optical image associated with said attitude of at least one section of said blade (9) with respect to said hub (5);

characterized in that said sensor means (25) comprise a camera (26, 26');

said sensor means (25) comprising at least one said camera (26, 26') for each said blade (9);

said sensor means (25) comprising two stereoscopic cameras (26) to produce said optical image of each said blade (9).

15. A rotor (3, 3') for a hover-capable aircraft (1), comprising:
- a drive mast (6);
- a hub (5) operatively connected to said drive mast (6) and rotatable about a first axis (A); and
- at least two blades (9) hinged to said hub (5), via a rigid or elastically deformable connection, so as to be able to assume an attitude rotated about and/or translated along at least a second axis (B, C, D) with respect to said hub (5);
- said rotor (3, 3') further comprising sensor means (25) configured to detect said attitude of at least one said blade (9) with respect to said hub (5);
- said sensor means (25) being configured to acquire an optical image associated with said attitude of at least one section of said blade (9) with respect to said hub (5);
- characterized in that said sensor means (25) comprise a camera (26, 26');
- said sensor means (25) comprising at least one said camera (26, 26') for each said blade (9);
- said rotor (3, 3') further comprising a flow conveyor (10) rotatable about said first axis (A) in an angularly integral manner with said hub (5);
- said flow conveyor (10) carrying said sensor means (25);
- said rotor (3, 3') further comprising an illuminating device (27) designed to illuminate, in use, said blade (9), when said optical image is acquired, in use, by said sensor means (25);
- said flow conveyor (10) being limited by a first and a second surface (11, 12) axially facing one another;
- said first surface (11) axially delimiting said flow conveyor (10) on the opposite side to said hub (5);
- said second surface (12) axially delimiting said flow conveyor (10) on the side closes to said hub (5);
- said second surface (12) comprising said illuminating device (27) to illuminate the area of interest of said blades (9) during the acquisition of said optical image;
- said illumination device (27) being synchronized with the acquisition of said optical image by said camera (26, 26').

16. A method for detecting the attitude of at least one blade (9) with respect to a hub (5) of a rotor (3) for a hover-capable aircraft (1);
- said blade (9) being hinged to said hub (5) via a rigid or elastically deformable connection, so as to be able to assume an attitude rotated about and/or translated along at least a second axis (B, C, D) with respect to said hub (5);
- said method comprising the step of:
- i) detecting the attitude of at least one section of said blade with respect to the hub (5);
- said step i) comprising the further step ii) of acquiring, via sensor means (25), an optical image associated with said attitude of at least said blade (9) with respect to said hub (5);
- characterized in that said sensor means (25) comprise a camera (26, 26'); said sensor means (25) comprising at least one said camera (26, 26') for each said blade (9);
- said sensor means (25) comprising two stereoscopic cameras (26) to produce said optical image of each said blade (9).

17. A method for detecting the attitude of at least one blade (9) with respect to a hub (5) of a rotor (3) for a hover-capable aircraft (1);
- said blade (9) being hinged to said hub (5) via a rigid or elastically deformable connection, so as to be able to assume an attitude rotated about and/or translated along at least a second axis (B, C, D) with respect to said hub (5);
- said method comprising the step of:
- i) detecting the attitude of at least one section of said blade with respect to the hub (5);
- said step i) comprising the further step ii) of acquiring, via sensor means (25), an optical image associated with said attitude of at least said blade (9) with respect to said hub (5);
- characterized in that said sensor means (25) comprise a camera (26, 26'); said sensor means (25) comprising at least one said camera (26, 26') for each said blade (9);
- said rotor (3, 3') further comprising a flow conveyor (10) rotatable about said first axis (A) in an angularly integral manner with said hub (5);
- said flow conveyor (10) carrying said sensor means (25);
- said rotor (3, 3') further comprising an illuminating device (27) designed to illuminate, in use, said blade (9), when said optical image is acquired, in use, by said sensor means (25);
- said flow conveyor (10) being limited by a first and a second surface (11, 12) axially facing one another;
- said first surface (11) axially delimiting said flow conveyor (10) on the opposite side to said hub (5);
- said second surface (12) axially delimiting said flow conveyor (10) on the side closes to said hub (5);
- said second surface (12) comprising said illuminating device (27) to illuminate the area of interest of said blades (9) during the acquisition of said optical image;
- said illumination device (27) being synchronized with the acquisition of said optical image by said camera (26, 26').

* * * * *